C. B. HAZARD.
HARVESTER.
APPLICATION FILED MAR. 17, 1911.
1,051,839.
Patented Jan. 28, 1913.
7 SHEETS—SHEET 2.
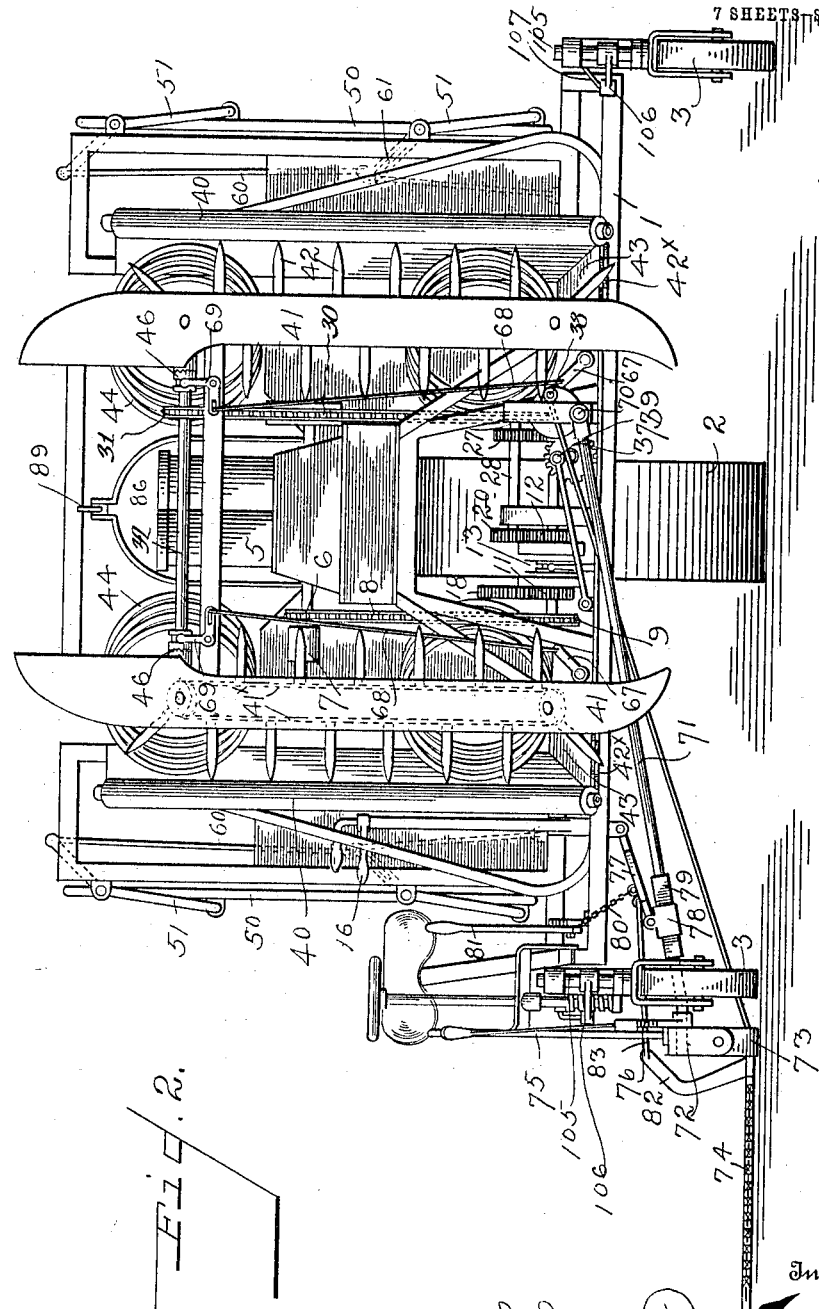

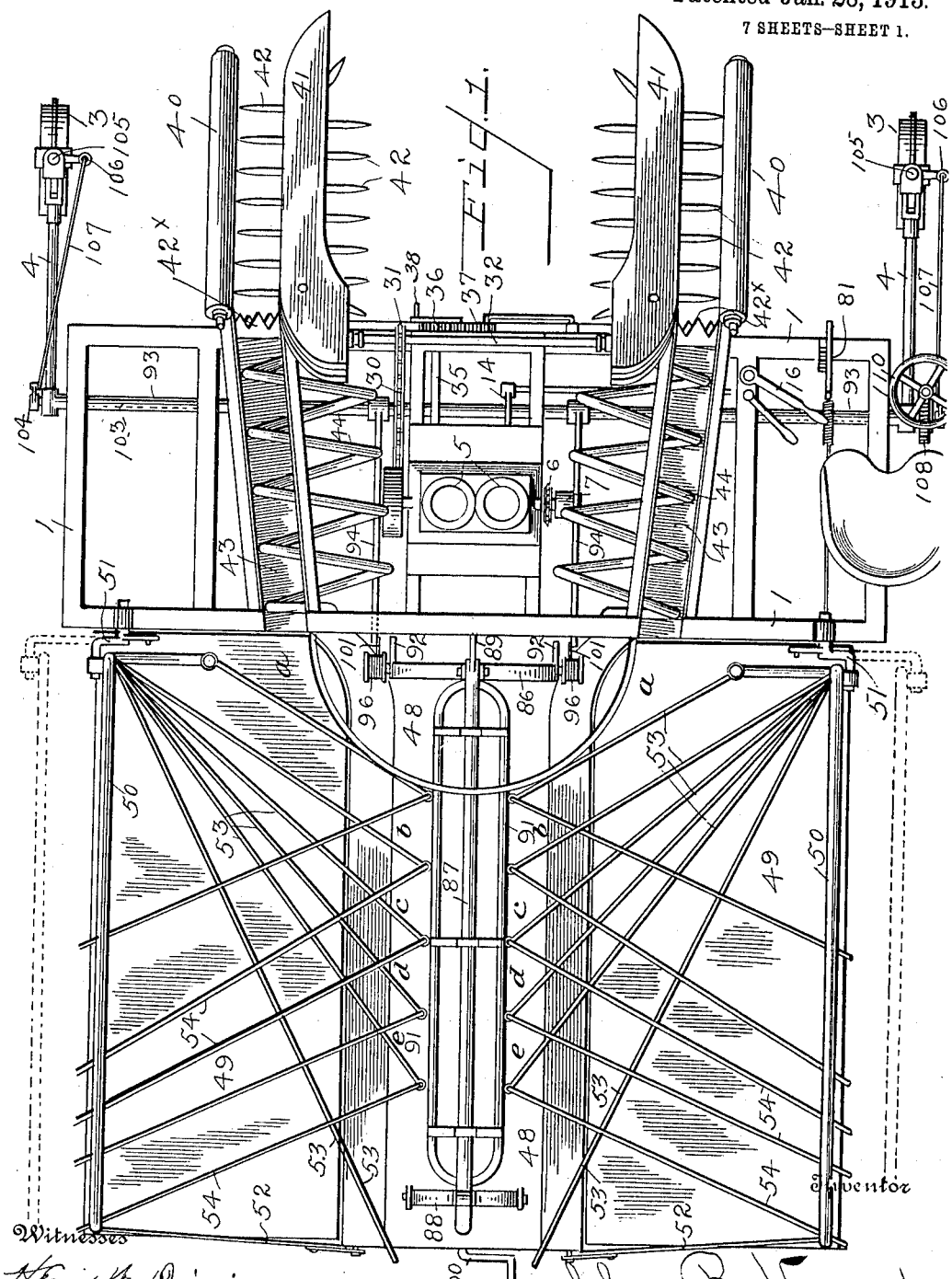

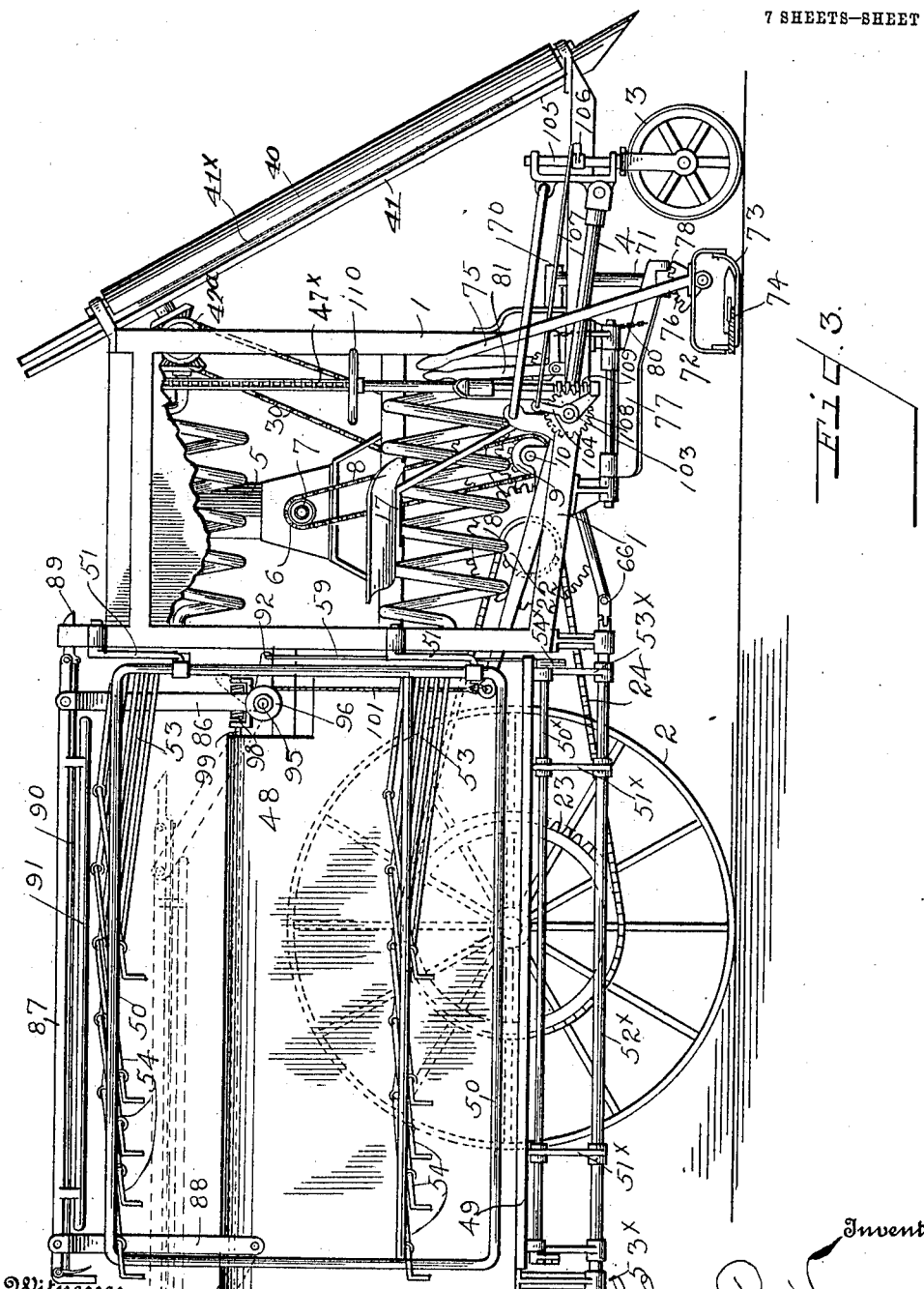

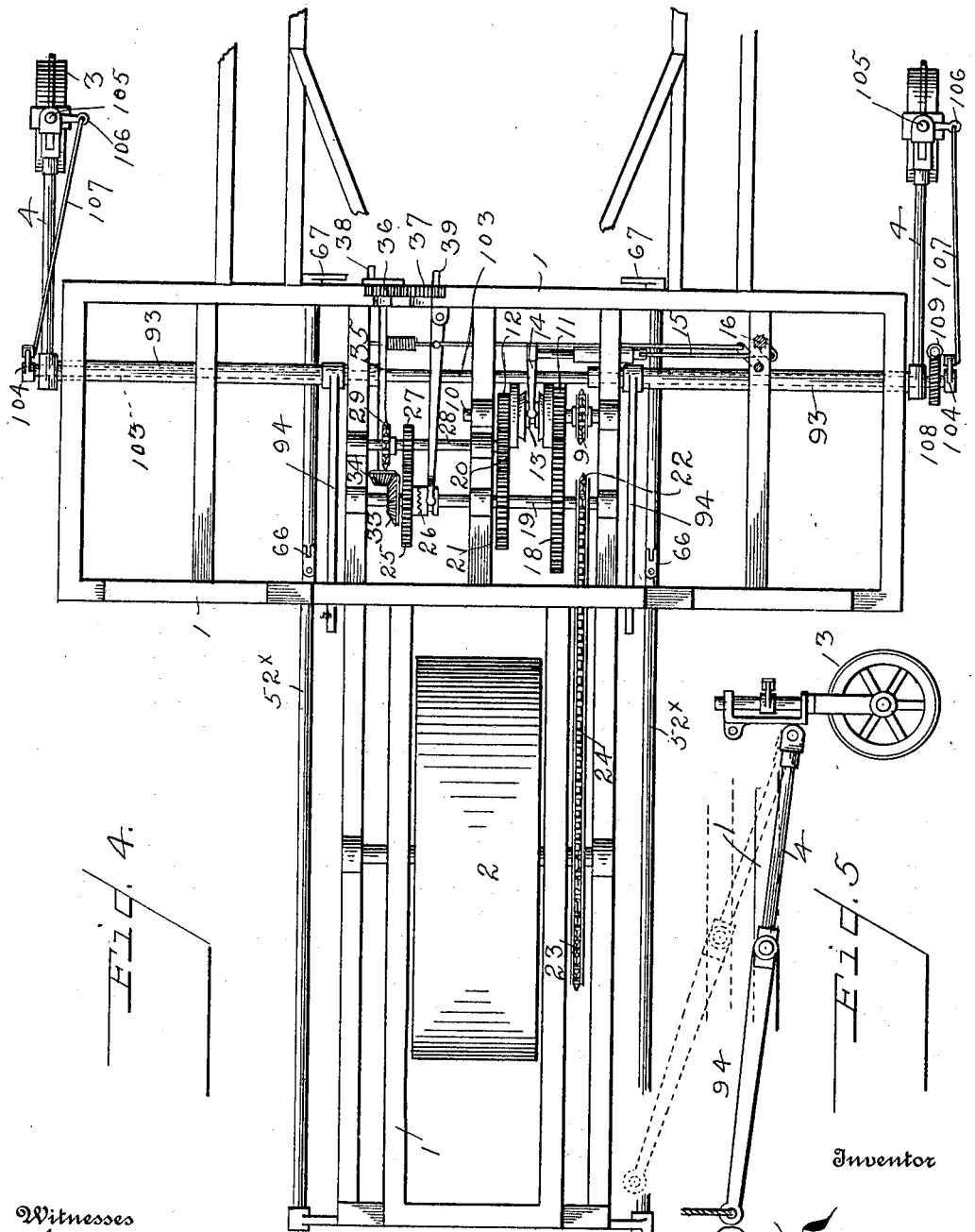

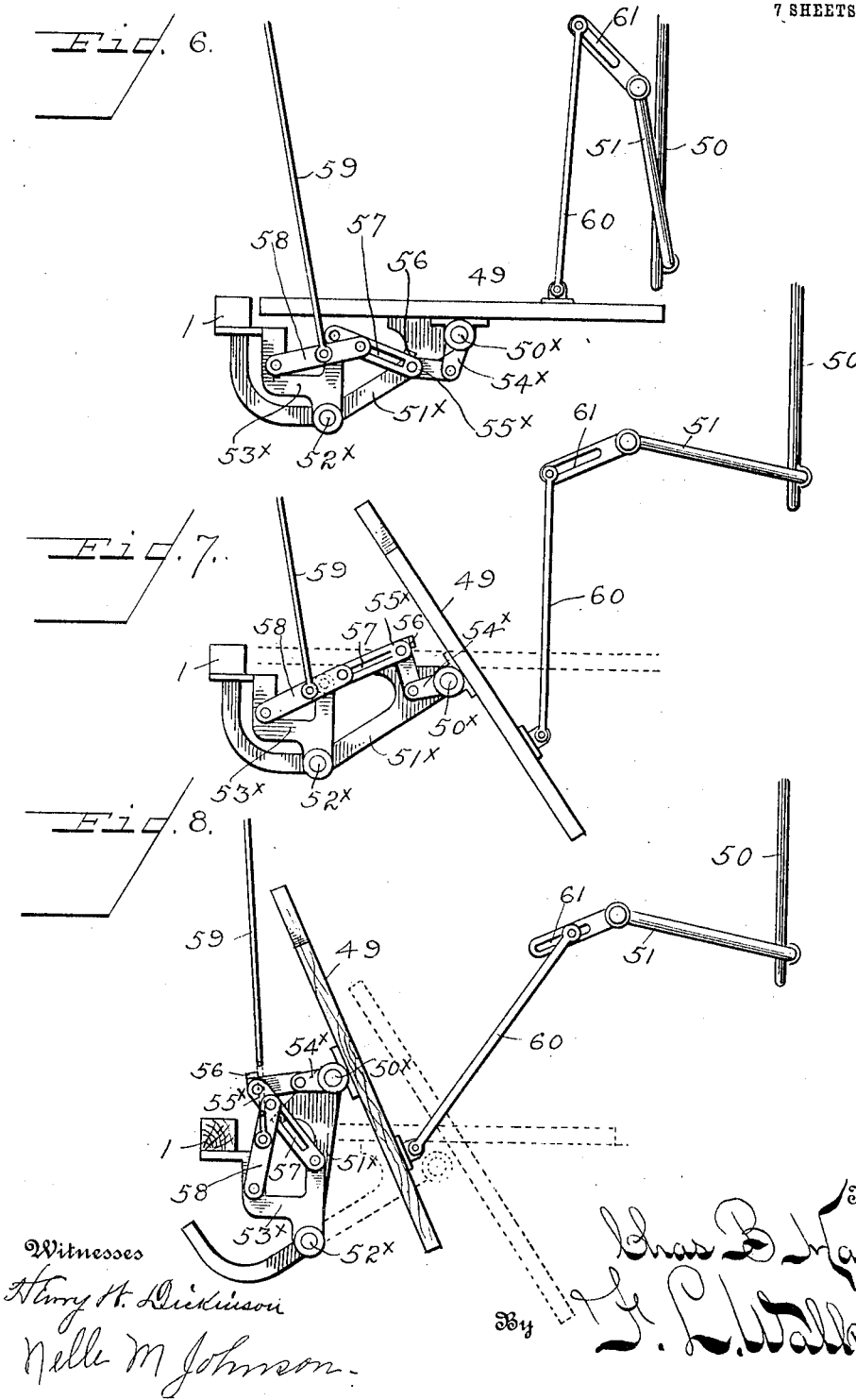

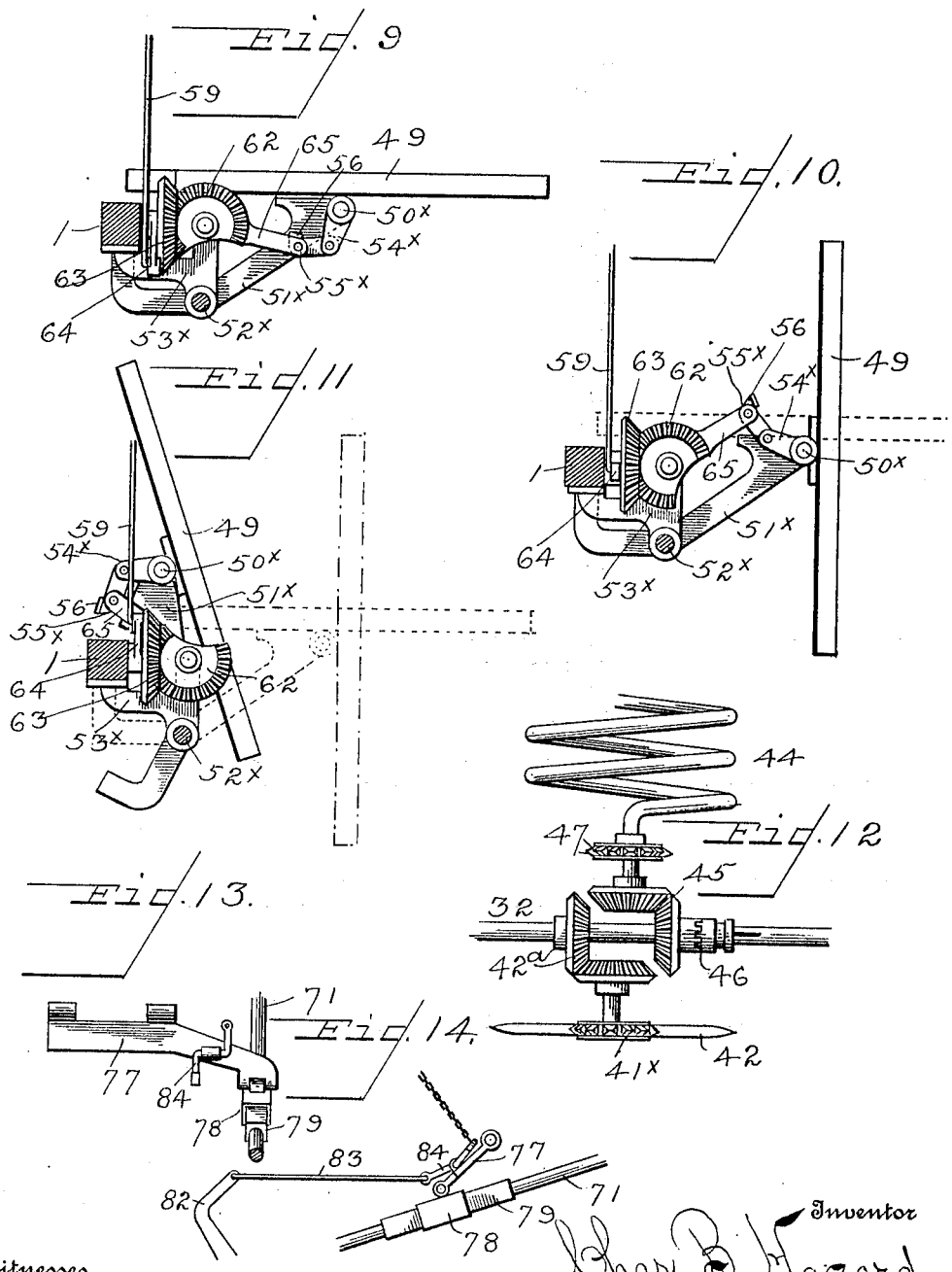

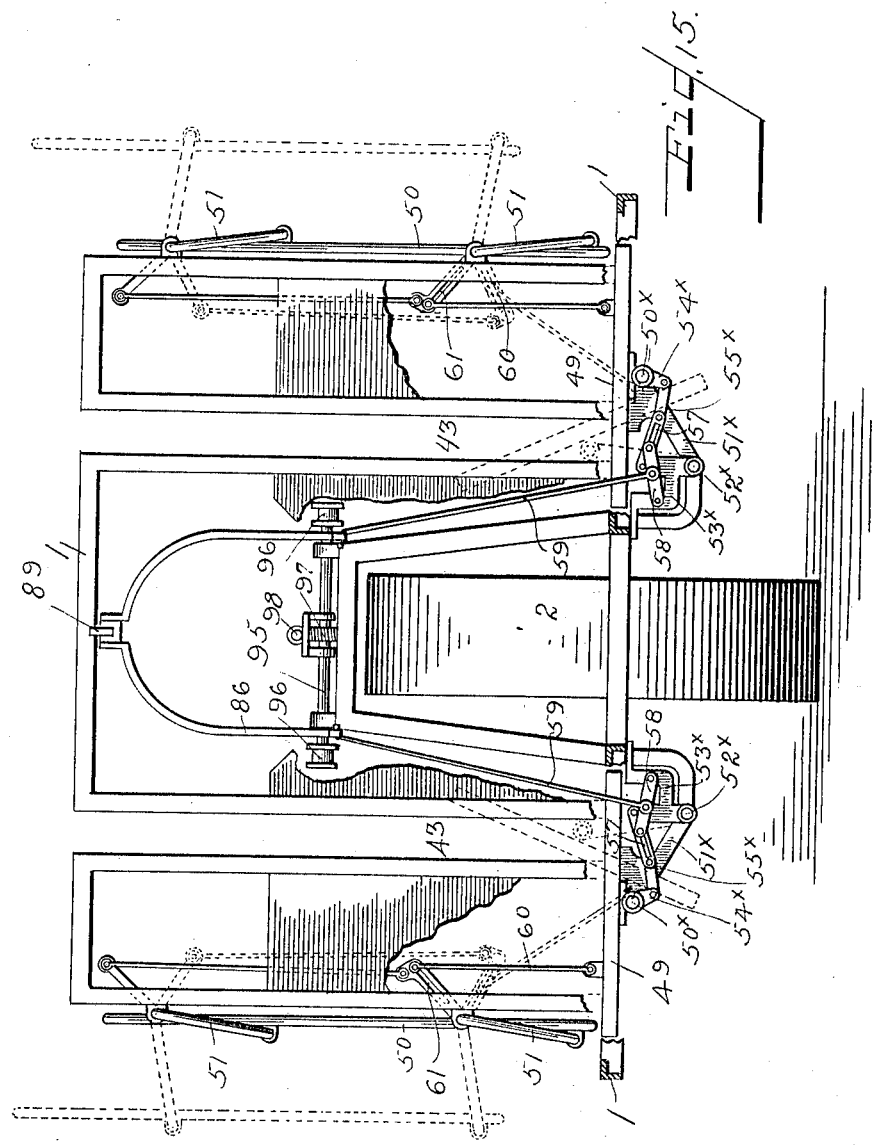

UNITED STATES PATENT OFFICE.

CHARLES B. HAZARD, OF XENIA, OHIO.

HARVESTER.

1,051,839.

Specification of Letters Patent. Patented Jan. 28, 1913.

Application filed March 17, 1911. Serial No. 615,049.

*To all whom it may concern:*

Be it known that I, CHARLES B. HAZARD, a citizen of the United States, residing at Xenia, in the county of Greene and State of Ohio, have invented certain new and useful Improvements in Harvesters, of which the following is a specification.

My invention relates to harvesters, and particularly to machines for harvesting corn, cane or similar growth, by severing the growing stalks, collecting the severed stalks into a receiving compartment, and discharging the collected stalks when a predetermined quantity has been received.

The object of the invention is to simplify the structure as well as the means of mode of operation of such devices, whereby they will not only be cheapened in construction but will be more efficient in use, easily operated and unlikely to get out of repair.

A further object of the invention is to provide an improved form of receiving compartment for the severed stalks, and provide improved means for discharging the severed stalks from such compartment when a predetermined quantity has been collected.

In growths of the nature before mentioned, the lower part of the stalk is of woody character and contains but little nutriment, and is of comparatively small value as a food product. It is therefore desirable to harvest the usable portion by severing the stalks at some distance above the ground, leaving the remaining or unusable portion in the form of stubble, which under ordinary conditions must later be removed.

A further object of the invention is to provide a mowing attachment for the harvester, which will remove the stubble remaining after the useful portion of the stalk has been harvested, by severing such stubble in close proximity to the surface of the ground. Such mowing attachment however may be used for other purposes, as for harvesting growths of other character, such as hay, clover, oats, peas, etc.

A further object of the invention, is to provide improved means for actuating the various moving and interengaging parts.

With the above primary and other incidental objects in view, as will more fully appear in the specification, the invention consists of the features of construction, the parts and combinations thereof, and the mode of operation or their equivalents as hereinafter described and set forth in the claims.

Referring to the drawings, Figure 1 is a plan view of the assembled harvester. Fig. 2 is a front elevation thereof, showing the mowing attachment and the actuating mechanism thereof. Fig. 3 is a side elevation partly broken away of the assembled harvester, showing the mowing attachment in conjunction therewith. Fig. 4 is a plan view of the frame portion of the machine, and the actuating mechanism, with the superstructure removed. Fig. 5 is a detail view of the raising and lowering mechanism for the frame. Fig. 6 is a detail view showing one of the platforms of the receiving compartment in its normal position. Fig. 7 shows the main platform tilted or partially operated. Fig. 8 shows the platform shifted or in its fully operated position, the several previous positions being shown in dotted lines. Figs. 9, 10, and 11 show a modification of the platform operating mechanism, the several figures showing the platform in different positions corresponding to those shown in Figs. 6, 7 and 8. Fig. 12 is a detail view showing the driving connections of one of the packers and elevators. Figs. 13 and 14 are side and front elevations respectively of the adjusting mechanism for the mowing attachment. Fig. 15 is a transverse sectional view.

Like parts are indicated by similar characters of reference through the several views.

While the machine forming the subject matter hereof is shown and described as motor operated, forming a farm tractor of general utility, it is to be understood that the machine may be drawn by horses or propelled by other means, and the several operating parts driven from the carrying wheels.

The machine comprises a main frame 1, preferably formed from angle irons and supported on three carrying wheels, a main carrying wheel 2 centrally located and two swivel outrider wheels 3 located adjacent to the forward portion of the machine. The swivel wheels 3 are carried by adjustable arms 4, the oscillation of which, by means hereafter described, causes the raising or lowering of the frame, thereby adjusting the plane of operation of the severing devices.

The machine is adapted to harvest two rows of standing corn at the same time, the main carrying wheel being adapted to travel between said rows, and the swivel wheels 3 at the outer side of the rows.

The wheels 3 are carrying wheels only, while the wheel 2 forms a driving wheel actuated by a gasolene or other form of motor 5 carried on the machine, which not only propels the machine, but also actuates the several parts thereof. The motor or engine 5 is mounted upon the forward portion of the main frame, and carries upon its drive shaft a sprocket 6, and also a drive pulley 7 which may be employed to drive other machinery when the machine herein described is not in use as a harvester, but when it is desired to use the motor merely for power purposes. A drive chain 8 extends from the sprocket 6 to a sprocket 9 on a transverse countershaft 10 in the lower part of the main frame. Loosely journaled on the shaft 10 are two gears 11 and 12, either of which may be engaged with the shaft 10 by means of a shifting clutch 13 adapted to be moved by a sliding shift member 14 operated by a link 15 extending from the control lever 16 adjacent to the operator's seat 17 on the right hand side of the main frame. The gear 11 meshes with the corresponding gear 18 on a counter shaft 19, located at the rear of shaft 10. The gear 17 meshes with an intermediate pinion 20, which in turn meshes with a gear 21 also mounted on the transverse shaft 19. The gear train including the pinion 20 provides means for driving the shaft 19 in a reverse direction. Thus by operating the control lever 16, either the gear 11 or the gear 12 may be operatively engaged with the shaft 10 by the clutch 13, thereby driving the machine either forward or rearward. Mounted on transverse shaft 19 is a sprocket 22 connected by a drive chain 24 with a corresponding sprocket 23, located on the shaft of the main carrying and drive wheel 2. Also journaled on the shaft 19 is a gear 25 engaged with such shaft by a clutch 26. The gear 25 meshes with the pinion 27, mounted on a counter shaft 28, upon the extremity of which the pinion 20 is carried. The shaft 28 also carries a sprocket wheel 29 connected by a sprocket chain 30 with a sprocket 31 located on a transverse shaft 32. There is also carried on the shaft 19 a bevel gear 33 meshing with a corresponding pinion 34 on a longitudinal shaft 35 carrying at its forward end a gear 36 meshing with a gear 37 journaled on the forward portion of the frame. The forward end of the shaft 35 is provided with a head and wrist pin or crank 38, while the gear 37 carries a similar wrist pin or crank 39 for purposes hereinafter mentioned. This constitutes the main actuating or driving system of the machine.

At the forward portion of the machine there are provided forwardly and downwardly extending dividers adapted to engage the stalks of corn and guide them to the cutting devices. The outermost dividers comprise rollers 40 journaled in the main frame, these rollers are not power driven but are adapted to yield or rotate when engaged by the stalks of corn. The innermost dividers 41 comprise a frame, composed of two parallel boards, between which are mounted sprocket wheels, over which travel sprocket chains 41$^x$ carrying spikes or fingers 42 adapted to engage and lift the fallen stalks of corn. The sprockets and their sprocket chains 41$^x$ carrying the spikes 42 are continuously driven by the means of bevel gears 42$^a$ (see Fig. 12), one of which is secured upon the transverse shaft 32 in the upper forward portion of the machine.

Located at each side of the machine between the divider members 40 and 41 are the severing devices 42$^x$ comprising inclined guide members and reciprocating cutter blades coöperating therewith to sever the stalks of corn or other growth in a plane somewhat elevated above the ground. These devices are best shown in Figs. 1 and 2. The reciprocating cutter blades are carried on a common reciprocating bar whereby the cutting devices at both sides of the machine operate in unison. The reciprocating bar carrying the cutter blades is operated by means of a pitman connected to the crank or wrist pin 39 carried by the gear 37.

Extending rearward from each of the severing devices 42$^x$ is a restricted passage or chute 43 through which the severed stalks are conveyed to the receiving compartment at the rear of the machine. The restricted passages 43 are provided with continuous bottoms and vertical side walls. Through the inner walls of the passages helical packers 44 project to a point adjacent to the outer side wall or across the said passage. The helical packers 44 are four in number and are arranged in pairs at each side of the machine, one of the packers projecting into the upper portion of the restricted passage, while the other packer is so located as to project into the lower portion thereof. The helical packers are journaled in the main frame adjacent to but outside the restricted passage ways 43 and are driven from the shaft 32 by means of the beveled gears 45 one of which is loosely mounted on the shaft 32 and adapted to be engaged therewith by a clutch 46 whereby the operation of the packers may be arrested as hereinafter described. The uppermost packers 44 are driven directly from the drive shaft 32 by means of said beveled gears 45, while the lower packers are connected to and driven from the upper packers by means of a sprocket chain 47ˣ passing over suitable sprockets 47 carried by the packer members.

The stalks of corn or other growth severed by the devices 42ˣ are conveyed rearward through the passages 43 in upright position by the screw like action of the helical packers 44 before mentioned, and are discharged from the passage ways 43 into the receiving compartment located at the rear of the machine. The receiving compartment is divided centrally into right and left divisions or portions into which the right and left passage ways 43 discharge respectively, by a vertically disposed housing 48 inclosing the main carrying wheel 2.

Each portion or division of the receiving compartment is provided with a tilting bottom 49 and a movable side member 50, movable to and from the centrally disposed housing 48, but maintained in parallel relation therewith at all points of its adjustment. The side members 50 are supported on swinging arms 51, journaled to the main frame of the machine and adapted by their oscillatory movement to carry the side members 50 outward and upward away from the collected stalks within the compartment whereby said stalks will be released. Two or more of the swinging arms 51 are provided and said arms are preferably of equal length whereby the said members 50 will be maintained in a parallel relation throughout all points of their movement.

The side members are connected at their rear with the centrally disposed housing 48 by transverse links or gates 52 (see Fig. 1) which form the rear inclosure of the compartment and hold the side members in normal position. These gates may be secured in position by hooks, latches or other fastening means to be released by the operator prior to the discharge of the stalks as hereafter mentioned. Carried on each of the side members 50 and extending inward and rearward in a divergent or fan like formation are a plurality of flexible spring arms 53, to the extremity of each of which is connected a reciprocating guide rod 54, sliding in bearings 55 on the side member 50. The spring arms 53 are arranged in two series an upper series adjacent to top of the side members 50 and a lower series located adjacent to the bottom of the compartment, the lowermost series of the spring arms 53 extend adjacent to the centrally disposed housing 48, while the uppermost series preferably overhang said housing 48 as clearly shown in Fig. 1.

As the several stalks are forced backward into the compartment by the helical packers 44, they fill the first space $a$ formed by the first of the flexible arms 53, and by bearing upon the first of the series of said flexible arms force the arm aside until the second of the flexible arms 53 is engaged, which increases the resistance of the arms to a degree greater than the force required to move the collected stalks. This causes the severed stalks to pass from the first space $a$ into the second small space $b$, formed by the arms 53 and as additional stalks are added to those collected within the compartment, the successive spaces $c$, $d$, $e$, etc., are filled, the tendency of the stalks being to pass from one space to the other toward the rear of the machine where they come to rest forming the beginning of the shock. The spring arms 53 tend to keep the stalks upright during their passage through the receiving compartment and to keep the collection of stalks compact. The first stalks reaching the rear of the compartment force the arm 55 outward, gradually filling the space at the rear of the compartment. As the collection of stalks increases each spring arm 53 is pressed outward in turn to afford additional space for the collection of stalks, the shock thus being formed from the rear of the machine, and growing forward, the spring arms yielding as greater space is required. The severed stalks contained in the receiving compartment of the machine whether in large or small quantities are always under the pressure of spring arms 53. The springs arms 53 never arrest the progress of the stalks toward the rear but only confine the stalks to a comparatively narrow path through which the stalks flow toward the rear of the compartment.

In harvesting machines as usually constructed the formation of the shock begins at the forward or entrance point of the compartment, and it is necessary to move a constantly increasing load of stalks. In the present device, the heaviest load to be moved by the packers is that when the first stalks reach the rear of the compartment which constitutes but a small portion of the completed stock. From the time the first stalks reach the rear of the compartment, the load imposed upon the packers is constantly decreasing as the collection of stalks grows and the path of the severed stalks through the compartment decreases. When the compartment has been completely filled the spring arms 53 and the reciprocating rods 54 will assume positions substantially parallel with the side members 50. It then becomes necessary to discharge the collection of severed stalks, by tipping the bottom sections of the compartment outward. The tiltable or movable bottom section 49 of each division of the receiving compartment is carried upon a longitudinal revoluble shaft 50ˣ journaled in swinging arms 51ˣ rigidly carried upon a second longitudinal shaft 52ˣ. The operating connections of the movable bottom sections are best shown in Figs. 6, 7, and 8. The longitudinal shaft 52× upon which the swinging arms 51× are supported is carried in suitable brackets 53× projecting from the main frame 1. The inner ends of the swinging arms 51× engage the frame portion 1 to limit the movement of the swinging arms in one direction. Secured upon the oscillating shaft 50× is a rock arm 54× connected by toggle link 55× with the supporting bracket 53. The toggle link 55× when moved to a position slightly beyond alined position as shown in Fig. 6 is adapted to lock the platform or bottom of the compartment in its normal position, the movement of the toggle link 55× in such direction being limited by a lug 56 carried on one member of such toggle link and engaging the other member thereof. One member of the toggle link 55× is slotted as shown at 57 and such slotted member is engaged by an oscillating lever 58 shown in the drawing as pivoted to the supporting bracket 53×, but which may be supported upon any portion of the main frame. The lever 58 is adapted to be oscillated by the upward movement of the link 59, such oscillatory movement of the lever 58 through its connection with the slot 57 of the slotted member of the toggle link, will cause oscillatory or upward movement of such slotted member as shown in Fig. 7 which drawing the rock arm 54× upward therewith will cause an oscillatory movement of the shaft 50× and thereby tip or tilt the bottom portion 49. This tilting movement of the bottom portion 49 will discharge the collected stalks downward and outward from the compartment. The movable or tilting portion 49 is connected by a link 60 with the inner extremities of the swinging arms 51, which carry the movable side sections 50 of the compartment. The movement of the bottom portion 49 to its tilted or inclined position, as shown in Fig. 7, drawing upon the link 60 will oscillate the swinging arms 51 to move the side member 50 outward and upward, thereby releasing the severed stalks at the time the bottom portion 49 is tilted to discharge them. After the bottom portion 49 has been tilted or tipped as shown in Fig. 7 a further movement of the link 59, causing an additional oscillatory movement of the lever 58 and slotted member, will cause a swinging movement of the supporting arm 51× in an upward direction carrying with it the bottom section 49, thereby shifting said bottom section inward and away from the discharged stalks as shown in Fig. 8. The subsequent inward or shifting movement of the movable bottom after having been tilted or tipped to discharge the stalks serves to disengage the stalks from the bottom, permitting the machine to be readily withdrawn from the discharged stalks. The inner portion of the swinging arm 51, is slotted as shown at 61 to compensate for the movement of the platform to its extreme position as shown in Fig. 8. Upon the return or downward movement of operating link 59, the swinging lever 58 is caused to bear upon the slotted member of the toggle link 55, which first serves to turn the swinging arm 51× downward to its normal position and by additional movement return the toggle 55 to the position shown in Fig. 6, which causes the movable platform or bottom portion 49 to assume its horizontal position ready to receive the next consignment of severed stalks. In its return movement the bottom portion 49 is assisted by the side portions 50, the weight of which upon the swinging arms 51 tends to return said arms 51 to normal position, the said arms in turn connecting through the link 60 to pull the platform 49 back to horizontal position. When the receiving compartment is filled, the weight of the severed stalks upon the movable bottom, and against the side member 50 will assist in operating said parts to discharge the load. When the compartment is completely filled the severed stalks therein being under compression tend to force the side member 50 outward, this movement of the side members is assisted by the spring arms 53, bearing upon the collection of stalks within the compartment. When in normal position the weight of the severed stalks upon the movable platform or bottom 49 is substantially balanced and but a slight movement of the operating parts is required to throw the preponderance of weight upon the outer side of the movable platform or bottom 49, thereby assisting in the operation of the platform and side members to discharge the collection of stalks.

In Figs. 9, 10, and 11 there is shown a modification of the operating mechanism thus described, in which one member of the toggle 55× is rigidly secured to a gear sector 62 journaled upon the supporting bracket 53. The gear sector 62 is oscillated by an intermeshing gear pinion 63 journaled on the main frame, and carrying a rock arm 64 engaged by the reciprocating operating link 59. By an upward draft upon the link 59 the gear pinion 63 is oscillated by means of the rock arm 64, and in turn causes the partial rotation of the gear sector 62 which elevates the arm 65 connected therewith and forming one member of the toggle link 55×. This movement of the arm 65 pulling upon the rock arm 54× causes an oscillation of the shaft 50× and thereby tilts the movable bottom portion 49 to a substantially vertical position, as shown in Fig. 10. Upon a further movement of the operating link 59, the gear members 62 and 63 will cause a swinging movement of the supporting arms 51×, carrying therewith the bottom portion 49 to the extreme inward limit of its stroke as is shown in Fig. 11. A reversal of the movement of the operating link 59 will again return the parts to normal position as shown in Fig. 9.

In discharging the collected stalks from the receiving compartment, the link bars or gates 52 at the rear of the machine are disconnected by manual effort, and the side frames 50 are swung outward and upward upon their supporting arms 51 to release the load of stalks and the bottom sections or tilting platforms 49 are oscillated simultaneously with the movement of the side members 50 to discharge the load outward. To cause this movement of the said parts there is provided on the frame of the machine, adjacent to the forward end of the central housing 48, pivoted bell levers 86. Said levers 86 are pivotally connected at their upper extremities with a longitudinal rod 87, extending rearward immediately above the housing 48 and supported at its rear end by pivoted arms 88. The rear end of the rod 87 is turned downward to form a handle and at its forward end it carries a pivoted latch 89 engaging one of the transverse bars of the main frame 1 to hold the bell levers 86 and the pivoted arms 88 in their normal position.

Extending rearward from the latch 89 to a point adjacent to the handle of the reciprocating rod 87 and supported in suitable keepers on said rod is a latch rod or link 90, by which the latch 89 may be disengaged from the frame by the operator while at the rear of the machine. The longitudinal rod 87 carries extended guide members 91 parallel therewith, which when in normal position assist in supporting the severed stalks within the compartment. When the latch 89 is disengaged from the transverse bar of the main frame the longitudinal rod 87 may be pulled rearward which oscillates the bell levers 86 and likewise the supporting arms 88 upon their pivotal connections. To the lateral arms 92 of each of the bell levers 86 is connected the operating link 59 of the platform operating mechanism, and upon the oscillation of the bell levers 86, as before mentioned by the rearward movement of the rod 87 the bottom sections or platforms 49 are oscillated to inclined position to discharge the load of severed stalks and the side members of the compartment are moved outward simultaneously therewith. The several parts are shown in operated position by dotted lines in Fig. 3.

The rock shafts 52$^x$ upon which the swinging arms 51$^x$ are supported extend toward the forward portion of the machine and may be provided with a pendant bearing portion extending below the main frame of the machine, or the forward portion of such rock shaft may be inclined upward as shown in Fig. 3 and connected with the main portion thereof by a universal joint 66 as shown in Figs. 3 and 4. At their forward extremities each of the rock shafts 52$^x$ is provided with a rock arm 67 connected by a link 68 with a bell lever 69 pivoted to the main frame, adjacent to the clutch 46 upon the shaft 32, one arm of which is adapted to engage and shift said clutch 46 into and out of engagement with the drive pinion 45 of the packer driving gears.

The construction is such that upon the oscillation of the rock shaft 52$^x$ by the swinging movement of the supporting arms 51$^x$ of the bottom portion 49, the rock arm 67 will operate through the link 68 to shift the clutch 46 out of engagement with the drive pinion 45 of the packer driving gears and thereby arrest the movement of the packers during the time the platform or movable bottom 49 is in its operated position, thus any severed stalks which happen to be within the passages or chutes 43 at the time of operation of the discharge mechanism will be retained in such passages or chutes until the receiving compartment is again returned to normal position to receive them. As before mentioned the machine is so constructed as to sever the growing stalks at a point somewhat above the ground, carrying the usable portion thereof to the receiving compartments, and leaving the unusable or woody portion standing upright in the field. The mowing attachment hereafter described is adapted to remove such standing stubble and may also be used for harvesting other growths as before mentioned.

Referring particularly to Fig. 2 there is provided a stud 70 projecting from the main frame, upon which is pivotally supported a carrier arm 71, to the extremity of which is journaled a frame member 72. Pivotally attached to the frame member 72 is a shoe 73, carrying a cutter bar 74 comprising guard fingers and reciprocating knife portions of usual construction. The frame member 72 which is revoluble upon the extremity of the carrier arm 71, is provided with an operating lever 75, having a detent engaging the usual notched segment 76 carried upon the carrier arm 71. By means of the lever 75 the frame member 72 may be oscillated upon the carrier arm 71 to incline the guard fingers and cutting devices of the cutter bar 74 upward or downward, thereby varying the cutting plane of the mowing attachment. The entire mowing attachment may be raised or lowered by means of a swinging frame member 77, pivotally supported upon the main frame and engaging a sliding sleeve or shoe 78 reciprocating upon the carrier arm 71. The carrier arm 71 is preferably provided with a polygonal or squared surface 79 upon which the shoe or sleeve 78 rides. The swinging frame or elevating device 77 is connected by a link or chain 80 with an operating lever 81 located on the main frame adjacent to the operator's seat, by means of which the frame 77 may be oscillated to raise or lower the carrier arm 71. In addition to its rotary movement about the journal bearings on the carrier arm 71 and its vertical movement through the operation of the swinging frame or elevating member 77, the cutter bar 74 is capable of an oscillatory movement about the pivotal connection of the shoe 73, whereby the cutter bar may be inclined or its outer end elevated to avoid an obstruction. For this purpose there is provided upon the cutter bar 74 an arm 82 connected by a link 83 with a bell lever 84 journaled upon the elevating member 77. See Figs. 13 and 14. The link or chain 80 of the operating lever 81 is connected to the opposite end of the bell lever 84. The construction is such that the initial movement of the control lever 81 will oscillate the bell lever 84 independent of the swinging frame or elevating member 77, thereby operating through the link 83 and the rigid arm 82 to oscillate the cutter bar 74 about the pivotal connection of the shoe 73 and elevate the outer end of said cutter bar. A further movement of the control lever 81 will oscillate the swinging frame or elevating member 77 to elevate the carrier arm 71 about the pivotal connection or stud 70 and thereby elevate the cutter bar 74 and its connections lifting them off the ground. The reciprocating knife of the cutter bar 74 is operated by a pitman 85 connected upon a wrist pin or crank 38 carried upon the forward end of the shaft 35. By disconnecting the carrier arm 71 from its pivotal stud 70 and the swinging frame or elevating member 77 from its pivotal connection on the main frame the mowing attachment may be readily removed from the main portion of the machine.

In order to guide the machine and enable the main frame thereof to be raised or lowered whereby the cutting devices may be made to operate at different heights, the outrider or swivel wheels are adjustable in relation to the main frame. The outrider or guiding wheels 3 are carried at the extremity of rock arms 4, supported on hollow transverse shafts 93 located in the forward portion of the machine, each of such hollow transverse shafts or sleeves being provided with a rearward extending arm 94.

Journaled in the main frame of the machine, adjacent to the forward extremity of the central housing 48 is a transverse shaft 95 carrying at each end thereof a drum 96. The transverse shaft 95 preferably though not necessarily forms the pivotal connection of the bell lever 86. Secured upon the transverse shaft 95 intermediate the drums 96 is a worm gear 97 engaged by a worm 98 on the extremity of a revoluble shaft 99 extending toward the rear of the machine, and carrying at its rearmost extremity a crank 100 whereby the worm gear may be operated to rotate the drums 96.

Cables 101 are attached to the rearmost extremity of the arms 94, and are adapted to be wound upon the drums 96 by the rotary movement thereof through the operation of the worm and worm gear before mentioned. By reeving the cables 101 upon the drums 96, the arms 94 are elevated thereby oscillating the hollow transverse shafts or sleeves 93 upon which are carried the arms 4, which are in turn connected to the bearing members of the swivel outrider wheels 3. Such elevation of the arms 94, by means of the worm and worm gear 97 and 98 will cause a corresponding elevation of the main frame 1 as shown in dotted lines in Fig. 5. By a reverse movement of the worm and worm gear the arms 94 and therewith the main frame 1 are lowered.

Extending entirely across the main frame of the machine and preferably though not necessarily through the hollow transverse shafts or sleeves 93 is an oscillatory shaft 103 carrying at each end thereof a rock arm 104. The vertical shaft 105 of each of the swivel outrider wheels 3 is provided also with a rock arm 106. The rock arms 104 of the transverse shaft 103 and the rock arms 106 of the vertical shafts 105 of the swivel wheels are connected by links 107. The transverse shaft 103 also carries a worm gear 108 operated by a worm 109 whereby the transverse shaft 103 may be oscillated to rock the arms 104 at each extremity thereof, and thereby oscillate the arms 106 upon the vertical shaft 105 of the swivel wheels 3 to guide the machine. The worm 109 is carried upon the lower end of a vertical shaft having at its upper extremity a steering wheel 110 adjacent to the operator's seat. This construction is best shown in Figs. 1, 3, and 4.

Having thus described my invention I claim;

1. In a harvesting machine, a main frame, carrying wheels, severing devices, a receiving compartment, two independently pivoted tilting bottom sections for the compartment, means for initially tilting the bottom sections to discharge the collected stalks and means for subsequently shifting the bottom sections toward each other while in tilted position, substantially as specified.

2. In a harvesting machine, a main frame, carrying wheels, severing devices, a receiving compartment, a pivoted bottom for the compartment, means for tilting the bottom to discharge the collected stalks, means for subsequently shifting the pivotal support of the bottom to withdraw the bottom from the discharged stalks, after the pivotal movement has been completed.

3. In a harvesting machine, a main frame, carrying wheels, severing devices, a receiving compartment, a tilting bottom for the compartment, swinging arms in which the bottom is journaled, means for tilting the bottom to discharge the stalks, and means to subsequently elevate the swinging arms to withdraw the bottom from the discharged stalks.

4. In a harvesting machine, a main frame, carrying wheels, severing devices, a receiving compartment, a tilting bottom for the compartment, a swinging support for the bottom, operating mechanism for the bottom adapted by its initial movement to tilt the bottom on its bearings in the swinging support, and by additional movement to oscillate the swinging support.

5. In a harvesting machine, a main frame, carrying wheels, severing devices, a receiving compartment, a tilting bottom for the compartment, a rock arm carried by the platform toggle links connected to the rock arm and adapted to hold the platform in normal position, operating means connected with the toggle links adapted on its initial movement to break the alinement of the links, to unlock the platform and upon additional movement, to oscillate the platform.

6. In a harvesting machine, a main frame, carrying wheels, severing devices, a receiving compartment, a tilting bottom for the compartment, a rock arm carried by the platform, toggle links connected to the rock arm and adapted to hold the platform in normal position, a pivoted lever having a sliding connection with one of the toggle links adapted by its initial movement to break the alinement of the links to unlock the platform, and by additional movement to oscillate the arm to tilt the platform.

7. In a harvesting machine, a main frame, carrying wheels, severing devices, a receiving compartment for the severed stalks, a vertically disposed movable side for said compartment, a tilting bottom therefor and means for simultaneously tilting said bottom and for moving the side upward and outward while maintaining the vertical position of the side.

8. In a harvesting machine, a main frame, carrying wheels, severing devices, a receiving compartment for the severed stalks, a movable bottom for said compartment, swinging arms a side member for the compartment carried by said arms and means to oscillate the arms whereby the side member will be shifted laterally to a position parallel with its normal position to release the collected stalks and a connection between the said bottom and side whereby the said parts will be moved in unison, substantially as specified.

9. In a harvesting machine, a main frame, carrying wheels, severing devices, a receiving compartment for the severed stalks, a movable side for said compartment, means for shifting the side outward to a parallel position to release the collected stalks, a tilting bottom for said compartment, a connection between the bottom and side whereby said parts will move in unison to discharge the collected stalks.

10. In a harvesting machine a main frame, carrying wheels, severing devices, a receiving compartment for the severed stalks, a movable side and a tilting bottom for said compartment, means to shift the side outward to release the stalks, and to tilt the bottom to discharge the stalks, and means to shift the tilted bottom away from the side member to disengage the discharged stalks.

11. In a harvester, a main frame, carrying wheels, severing devices, a receiving compartment for the severed stalks, bottom sections for the compartment pivotally supported to oscillate upon separated parallel axes, the said bottom sections extending inward or toward each other beyond the axes of oscillation and means to oscillate said sections whereby the mean edges of the sections will be initially carried upward and outward in a direction from each other thereby discharging the contents of the compartment outward in two separated portions, and means for subsequently causing the axes of oscillation of the bottom sections to approach each other while the bottom sections are in oscillated position, substantially as specified.

12. In a harvesting machine, a main frame, carrying wheels, severing devices, a receiving compartment for the severed stalks, a movable bottom for said compartment, a movable side member for the compartment, means to move the side member to release the severed stalks, means for operating the movable bottom to discharge the stalks, and for shifting the operated bottom to disengage it from the discharged stalks.

13. In a harvesting machine, a main frame, carrying wheels, severing devices, a receiving compartment for the severed stalks, a movable bottom for said compartment, a movable side member therefor adapted to be shifted to a position parallel with its normal position but removed outward therefrom, means for operating the side member to release the collected stalks and means for operating the movable bottom to discharge the collected stalks from the compartment.

14. In a harvesting machine, a main frame, carrying wheels, severing devices, a receiving compartment for the severed stalks, a dividing wall in the compartment separating the collected stalks into two portions, pivoted bottom sections for each portion of the compartment, means for simultaneously tilting said bottom sections to discharge both portions of the collected stalks and means for causing the bottom sections to subsequently approach each other while in tilted positions, substantially as specified.

15. In a harvesting machine, a main frame, carrying wheels, severing devices, a receiving compartment for the severed stalks, side members movable to and from each other through a parallel movement, movable bottom sections for the compartment, connections between the side members and bottom sections for simultaneously operating the side members and moving the bottom sections.

16. In a harvesting machine, a main frame, carrying wheels, severing devices, a receiving compartment for the severed stalks, oppositely disposed side walls and pivoted bottom sections therefor having separated axes of oscillation, means for simultaneously moving the side walls to release the collected stalks, and means for simultaneously tilting the bottom sections in opposite directions to discharge the collected stalks in separated portions.

17. In a harvesting machine, a main frame, carrying wheels, severing devices, a receiving compartment for the severed stalks, parallel swinging arms, a side member for the compartment carried by the arms, means for oscillating the arms whereby the side members will be shifted to a parallel position and stalk discharging means operating simultaneously with the movement of the swinging arms, substantially as specified.

18. In a harvesting machine, a main frame, carrying wheels, severing devices, a receiving compartment for the severed stalks, parallel swinging arms, a side member for the compartment carried by the arms, means for oscillating the arms whereby the side member will be shifted to a parallel position, a movable bottom for the compartment, and a connection between the bottom section and side member whereby the said parts will be caused to move in unison.

19. In a harvesting machine, a main frame, carrying wheels, severing devices, adapted to sever the usable portion from the standing stalks, a receiving compartment for the usable portion of the severed stalks, and a mowing attachment projecting laterally from the main frame and beyond the line of the stalks to be harvested and adapted to sever the waste stubble remaining in the previous path of travel of the machine after the usable portion of the stalk has been removed.

In testimony whereof, I have hereunto set my hand this 11th day of March A. D. 1911.

CHARLES B. HAZARD.

Witnesses:
HARRY F. NOLAN,
NELLE M. JOHNSON.

Copies of this patent may be obtained for five cents each, by addressing the "Commissioner of Patents, Washington, D. C."